United States Patent
Park et al.

(10) Patent No.: US 8,512,077 B2
(45) Date of Patent: Aug. 20, 2013

(54) JOINT BOX FOR CONNECTING HIGH VOLTAGE CABLES

(75) Inventors: Jeong-Ki Park, Seoul (KR); Hyun-Ju Kim, Kyunggi (KR); Hwa-Jong Kim, Kyunggi (KR)

(73) Assignee: Taihan Electric Wire Co., Ltd., Seoul (KR)

( * ) Notice: Subject to any disclaimer, the term of this patent is extended or adjusted under 35 U.S.C. 154(b) by 0 days.

(21) Appl. No.: 13/132,298

(22) PCT Filed: Mar. 2, 2010

(86) PCT No.: PCT/KR2010/001295
§ 371 (c)(1),
(2), (4) Date: Jun. 28, 2011

(87) PCT Pub. No.: WO2011/078438
PCT Pub. Date: Jun. 30, 2011

(65) Prior Publication Data
US 2012/0276779 A1    Nov. 1, 2012

(30) Foreign Application Priority Data
Dec. 22, 2009    (KR) .................. 10-2009-0128842

(51) Int. Cl.
*H01R 13/66* (2006.01)
(52) U.S. Cl.
USPC .................................... 439/620.21
(58) Field of Classification Search
USPC ............... 439/578–585, 620.21, 248
See application file for complete search history.

(56) References Cited

U.S. PATENT DOCUMENTS

| | | | | |
|---|---|---|---|---|
| 3,509,518 A | * | 4/1970 | Phillips | 439/281 |
| 3,602,872 A | * | 8/1971 | Braunstein | 439/425 |
| 3,846,738 A | * | 11/1974 | Nepovim | 439/584 |
| 3,871,735 A | * | 3/1975 | Herrmann, Jr. | 439/585 |
| 6,989,681 B2 | * | 1/2006 | Maekawa et al. | 324/754.03 |
| 7,628,629 B2 | * | 12/2009 | Miyazaki et al. | 439/248 |

FOREIGN PATENT DOCUMENTS

| | | | |
|---|---|---|---|
| JP | 08-017540 A | | 1/1996 |
| KR | 20000046925 | * | 7/2000 |
| KR | 20000046926 | * | 7/2000 |
| KR | 10-0291665 B1 | | 7/2001 |
| KR | 10-0291666 B1 | | 7/2001 |

OTHER PUBLICATIONS

ISR and Written Opinion for related International patent application PCT/KR2010/001295.
IPRP for related International patent application PCT/KR2010/001295.
ISR and Written Opinion for related International patent application PCT/KR2010/001295, Jan. 12, 2010.
IPRP for related International patent application PCT/KR2010/001295, Nov. 22, 2009.

* cited by examiner

*Primary Examiner* — Chandrika Prasad
(74) *Attorney, Agent, or Firm* — Billion & Armitage; Benjamin C. Armitage

(57) ABSTRACT

A device for connecting high voltage cable having a connection element comprising of first and second sleeves, each having a protrusion on a top for receiving first and second conductors of a first and second high voltage cables and fixing the first and second conductors by pressure; a contact bump being coupled to the protrusion in a sliding manner and an electrode unit having a key hole that the contact bump contacts with, wherein the first and second sleeves are coupled in a manner of male and female coupling.

8 Claims, 3 Drawing Sheets

PRIOR ART

JOINT BOX FOR CONNECTING HIGH VOLTAGE CABLES

TECHNICAL FIELD

The present invention relates to a device for connecting high voltage cables for forming one power transmission line by connecting conductors of the high voltage cables together and a joint box having the same. More specifically, the present invention relates to a device for connecting high voltage cables and a joint box having the same with enhanced workability, and reduced manufacturing costs due to a reduced length of the joint box, by changing a sleeve structure of a prior art joint box, and a connective structure between the sleeve and an electrode unit.

BACKGROUND

Generally, a high voltage cable is a kind of cable which is being used in a process of power transmission of electric power supply having a high voltage, and it is impossible to construct a whole power transmission line as a single line because a high voltage cable has a limited length. Accordingly, a power transmission line is constructed by connecting a plurality of high voltage cables using joint boxes.

A joint box of high voltage cables described above should be equipped with various components including a conductive sleeve for mutually fixing and conducting conductors, each of which forms an end part of the high voltage cables, and an electrode unit, being fixed by the conductor sleeve, for maintaining electrical insulation performance consistently.

FIG. 1 illustrates a front cross-sectional view of a joint box according to prior art, and FIG. 2 illustrates a combined cross-sectional view of the components of a joint box according to prior art.

Referring to FIGS. 1 and 2, a joint box 100 according to prior art, for example, compress a sleeve 120 for connecting conductors 115 of high voltage cables 110; an elect rode unit 130 being connected to the sleeve 120 through an electrode component 135; a tube body 140 for wrapping insulator 145 which is filled around the electrode unit 130; and stress relief covers 150, being coupled to both ends of the tube body 140, for pressing tightly the insulator 145 to the high voltage cables 110.

In the prior art joint box 100, as illustrated in FIG. 2, the conductors 115 are mutually connected by the sleeve 120 by inserting the conductors 115 into both sides of the sleeve 120 and then pressing them, under a condition that the sleeve 120 is exposed to a left or right side from the electrode unit 130. After that, a connecting procedure between the high voltage cables 110 and the electrode unit 130 is completed by placing the sleeve 120 at a center portion of the electrode unit 130 and then fixing the sleeve 120 to the electrode component 135 of the electrode unit 130 either using a fixing screw 137 or using a force-inserting manner.

However, in the prior art joint box 100 as described above, there is a problem that either one of metal sheaths 117 of the high voltage cables 110 is required to be cut by a length corresponding to that of the electrode unit 130, because the mutual connection between the conductors 115 and the sleeve 120 should be made under a condition that the sleeve 120 is exposed to a left or right side from the electrode unit 130.

Accordingly, an additional process of cutting either one of the metal sheaths 117 by a length corresponding to that of the electrode unit 130 is required in prior art and thus the length of the joint box 100 is extended so that the manufacturing costs are increased, and there is a space limitation as well that jointing work of a joint box is not available at a confined place due to the increased length of the joint box 110.

DETAILED DISCLOSURE OF INVENTION

Summary

The object of the present invention is designed to solve the prior art problems and provide a device for connecting high voltage cables and a joint box having the same with enhanced workability, and reduced manufacturing costs due to a reduced length of the joint box, by changing a sleeve structure of a prior art joint box, and a connective structure between the sleeve and an electrode unit.

According to a first aspect of the present invention to accomplish the object described above, the present invention provides a device for connecting high voltage cables comprising a connection element, being comprised of first and second sleeves, each having a protrusion on a top thereof, for receiving first and second conductors, respectively, of first and second high voltage cables and fixing the first and second conductors with pressure; a contact bump, being coupled to the protrusion in a sliding manner and being ascended and descended through an assistant device; and an electrode unit, having a key hole that the contact bump selectively contacts with, where the first and second sleeves are coupled mutually thereto in a manner of male and female coupling.

According to a second aspect of the present invention, the present invention provides a joint box comprising a connection element, being comprised of first and second sleeves, each having a protrusion on a top thereof, for receiving first and second conductors, respectively, of first and second high voltage cables and fixing the first and second conductors with pressure; a contact bump, being coupled to the protrusion in a sliding manner and being ascended and descended through an assistant device; an electrode unit, having a key hole that the contact bump selectively contacts with, where the first and second sleeves are coupled mutually thereto in a manner of male and female coupling; a tube body for wrapping insulator being filled around the electrode unit; and stress relief covers, being coupled to both ends of the tube body, for pressing tightly the insulator to the first and second conductors.

The following effects may be accomplished in the preset invention.

First, because first and second sleeves are coupled within an electrode unit in a manner of male and female coupling, under a condition that the conductors of the high voltage cables are independently coupled to the first and second sleeves, a connection operation of the high voltage cables is simplified and thus convenience of work is enhanced.

Second, because it is possible to couple first and second sleeves in an electrode unit under a condition that the conductors of the high voltage cables are independently coupled to the first and second sleeves, the length of metal sheaths to be cut is minimized and thus the manufacturing costs are decreased.

DETAILED DESCRIPTION

Hereinafter, the present invention will be described in more detail with reference to preferred embodiments of the present invention and the appended drawings.

Figure 1:
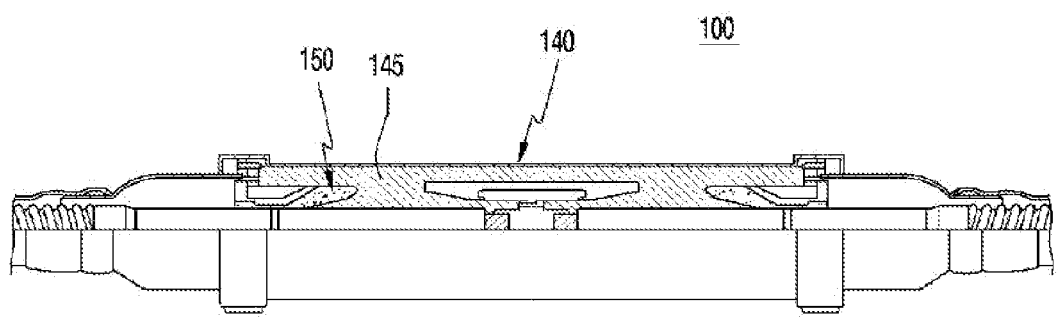
FIG. 1 illustrates a front cross-sectional view of a joint box according to prior art.
Figure 2:
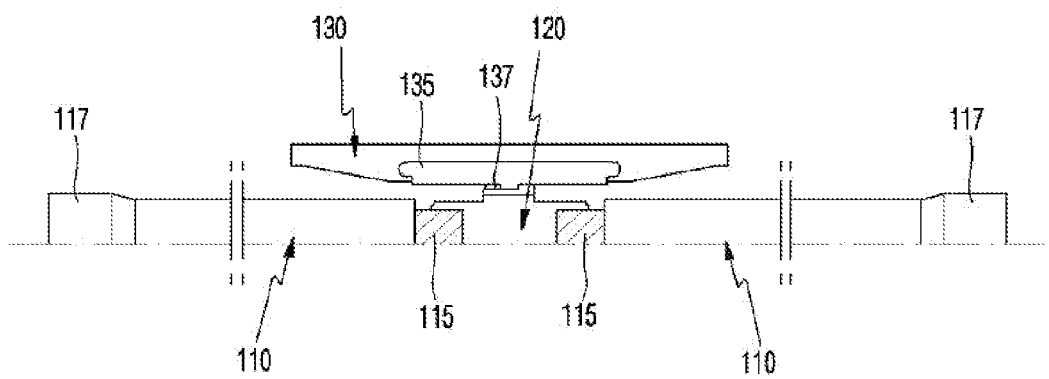
FIG. 2 illustrates a combined cross-sectional view of the components of a joint box according to prior art.
Figure 3:
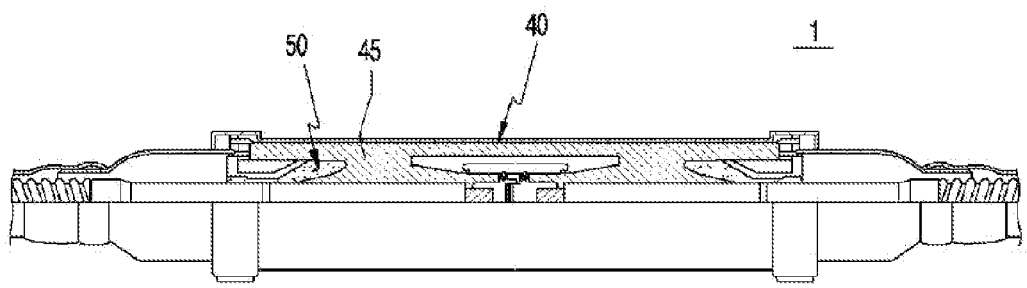
FIG. 3 illustrates a front cross-sectional view of a joint box according to the present invention.
Figure 4:
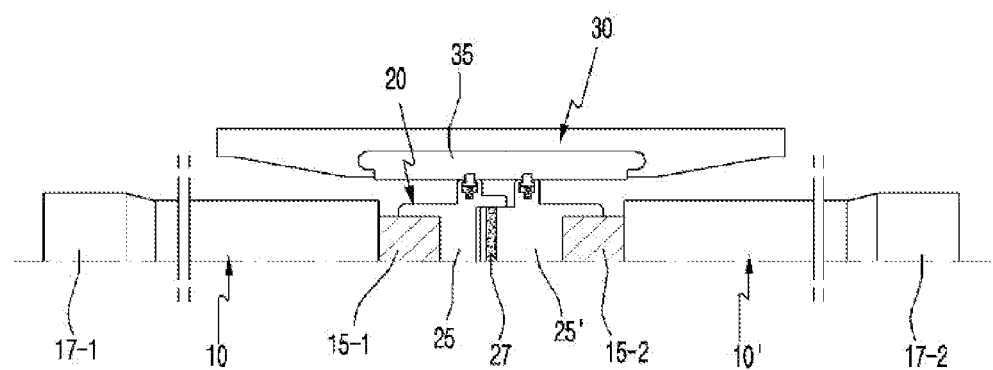
FIG. 4 illustrates a combined cross-sectional view of first and second sleeves of a joint box according to the present invention.
Figure 5:
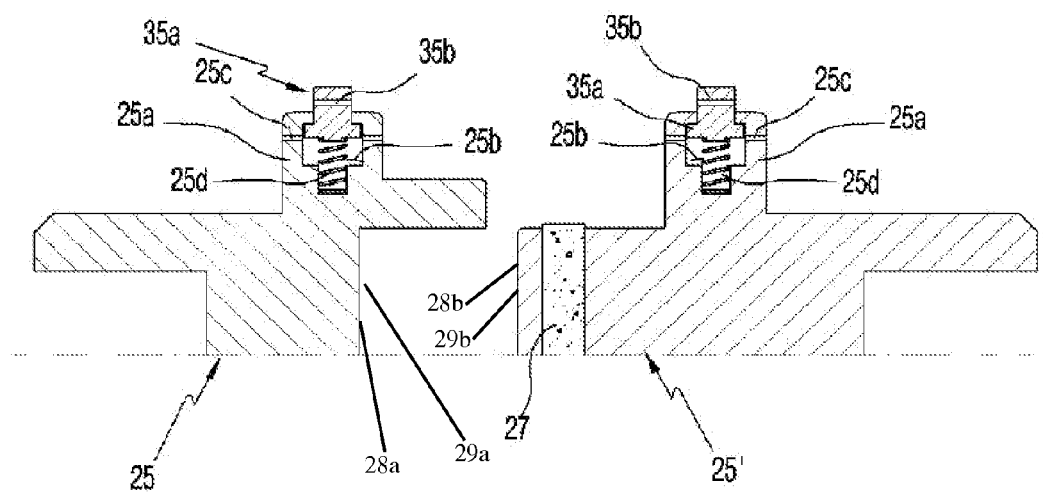
FIG. 5 illustrates an enlarged cross-sectional view of first and second sleeves of a joint box according to the present invention.
Figure 6:
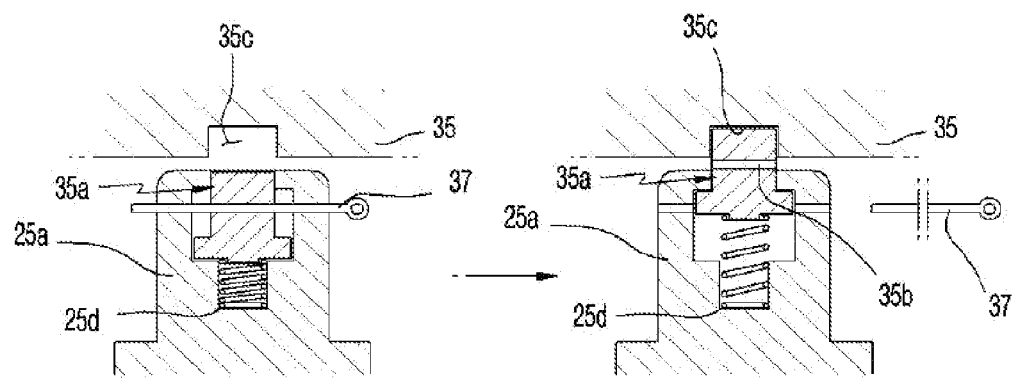
FIG. 6 illustrates a view showing a coupling process of an electrode unit of a joint box according to the present invention.

FIG. 3 illustrates a front cross-sectional view of a joint box according to the present invention, while FIGS. 4 to 6 illustrate a combined and an enlarged cross-sectional views of first and second sleeves of a joint box, and a view showing a coupling process of an electrode unit of a joint box, according to the present invention.

Referring to FIGS. 3 to 6, a device for connecting high voltage cables according to an embodiment of the present invention comprises a connection element 20, being comprised of first and second sleeves 25,25', each having a protrusion 25a on a top thereof, for receiving first and second conductors 15-1,15-2, respectively, of first and second high voltage cables 10,10' and fixing the first and second conductors 15-1,15-2, with pressure; a contact bump 35a, being coupled to the protrusion 25a in a sliding manner and being ascended and descended through an assistant device 25d; and an electrode unit 30, having a key hole 35c that the contact bump 35a selectively contacts with, where the first and second sleeves 25, 25' are coupled mutually thereto in a manner of male 28b and female coupling 28a.

A joint box according to an embodiment of the present invention comprises a connection element 20, being comprised of first and second sleeves 25,25', each having a protrusion 25a on a top thereof, for receiving first and second conductors 15-1,15-2, respectively, of first and second high voltage cables 10,10' and fixing the first and second conductors 15-1,15-2 with pressure; a contact bump 35a, being coupled to the protrusion 25a in a sliding manner and being ascended and descended through an assistant device 25d; an electrode unit 30, having a key hole 35c that the contact bump 35a selectively contacts with, where the first and second sleeves 25,25' are coupled mutually thereto in a manner of male 28b and female 28a coupling; a tube body 40 for wrapping insulator 45 being filled around the electrode unit 30; and stress relief covers 50, being coupled to both ends of the tube body 40, for pressing tightly the insulator 45 to the first and second conductors 15-1,15-2.

The device for connecting high voltage cables of the present invention described above is de signed to mutually couple the first and second conductors 15-1,15-2 and an elec-trode element 35 of the electrode unit 30 and is characterized in that the connection element 20 is comprised of the first and second sleeves 25,25'. Further, the device for connecting high voltage cables of the present invention is characterized in changing a coupling structure between the connection element 20 and the electrode unit 30. Such characteristics of the device for connecting high voltage cables of the present invention have technical features which are distinguishable from prior art.

Referring back to FIGS. 3 to 6, the first and second high voltage cables 10,10' are cables to be connected together for constructing a single power transmission line. The first high voltage cable 10 includes the first conductor 15-1 where an insulation layer is peeled at one end, and a first metal sheath 17-1 which wraps the insulation layer being provided around the first conductor 15-1. Further, the second high voltage cable 10' includes the second conductor 15-2 where an insulation layer is peeled at one end, and a second metal sheath 17-2 which wraps the insulation layer being provided around the second conductor 15-2.

The connection element 20 is designed for connecting the first and second conductors 15-1,15-2, which are provided at the ends of the first and second high voltage cables 10,10'. The connection element 20 is comprised of the first sleeve 25 and the second sleeve 25'. The first conductor 15-1 is received and fixed with pressure at an outer side of the first sleeve 25. The second conductor 15-2 is received and fixed with pressure at an outer side of the second sleeve 25'.

Further, a receiving hole 29a is formed at an inner side of the first sleeve 25 and a coupling bump 29b is formed a an inner side of the second sleeve 25' so that the inner side of the second sleeve 25' is coupled to the inner side of the first sleeve 25 in a manner of male 28b and female 28a coupling. Any skilled person in the art may fully understand that, even though a coupling bump is formed at an inner side of the first sleeve 25 and a receiving hole is formed at an inner side of the second sleeve 25', such a change of forming position of the receiving hole and the coupling bump should be within a scope of the present invention.

Further, it is preferable that at least either one of the first sleeve 25 and the second sleeve 25' has an electric contact band 27 so as to enhance electric contact efficiency between the first sleeve 25 and the second sleeve 25'.

Further, the protrusion 25a for receiving the contact bump 35a, which selectively contacts with the electrode element 35, is formed on the first sleeve 25 and the second sleeve 25', respectively.

Further, an ascending and descending hole 25b with a certain size appropriate for the contact bump 35a to move to and fro in a sliding manner is formed at a center of a top surface of the protrusion 25a, while a through-hole 25c is formed at the ascending and descending hole 25b in a horizontal direction. In this case, it is preferable that the contact bump 35a is formed to be a reverse-T shape in order to have a step portion at its bottom so as not to deviate from a condition that the contact bump 35a is inserted in the ascending and descending hole 25b.

Further, the assistant device 25d of the contact bump 35a may be embodied as a coil-type or plate-type spring which provides ascending and descending force to the contact bump 35a in order for the first sleeve 25 and the second sleeve 25' are coupled respectively to the electrode unit 30 under a condition that the assistant device 25d is received in an inner space of the first sleeve 25 and the second sleeve 25', preferably in an inner space of the ascending and descending hole 25b.

Moreover, the electrode unit 30 is designed for maintaining insulation performance of the high voltage cables 10,10'. The electrode element 35 for abutting an upper side of the first sleeve 25 and the second sleeve 25' is formed at a bottom surface of the electrode unit 30, while the key hole 35c which the contact bump 35a selectively contacts with is formed at a bottom surface of the electrode element 35.

Further, another through-hole 35b is formed in a horizontal direction on the contact bump 35a at a position corresponding to the through-hole 25c.

Further, a stop pin 37 is inserted horizontally into each protrusion 25a of the first and second sleeves 25,25' and the contact bump 35a of the electrode element 35 (specifically, the through-hole 25c of the protrusion 25a and the through-hole 35b of the contact bump 35a). The contact bump 35a maintains a non-contact state with the electrode unit 30 by the stop pin 37.

Further, the tube body 40 has an appearance that wraps a whole outer circumference of the electrode unit 30 and protects against external impact. The insulator 45 with various kinds including insulating oil or insulating gas is filled in the inner space between the tube body 40 and the electrode unit 30.

Further, it is desirable to attach a rubber plate for wrapping the insulator 45 to an inner circumference of the tube body 40 in order to protect against external impact additionally.

Herein, any skilled person in the art may fully understand that the tube body 40 according to the present invention can be embodied by any sealing device capable of wrapping wholly the components including the electrode unit 30 and protecting them, regardless of its materials.

The stress relief covers 50 are coupled to both ends of the tube body 40 for sealing both sides of the joint box 1, and perform a function of pressing tightly the insulator 45 to the first and second conductors 15-1,15-2.

Hereinafter, respective structural elements and operations of the present invention will be described in detail with reference to FIGS. 3 to 6.

First, in order to manufacture the joint box 1 according to the present invention, the first conductor 15-1 of the first high voltage cable 10 is received in an outer side of the first sleeve 25 and then is fixed with pressure, and the second conductor 15-2 of the second high voltage cable 10' is received in an outer side of the second sleeve 25' and then is fixed with pressure.

Thereafter, each stop pin 37 is inserted into the through-holes 25c,35b, each being formed in the protrusions 25a and the contact bumps 35a, respectively, and then the contact bumps 35a are set within the ascending and descending holes 25b in a stored state.

Thereafter, the first sleeve 25 and the second sleeve 25', which form the connection element 20, are contacted with each other within the electrode unit 30, and then the first and second sleeves 25,25' are contacted through the electric contact band 27 so that electric contact of the first and second high voltage cables 10,10' is made.

Thereafter, each stop pin 37, being inserted into the through-holes 25c,35b, is withdrawn therefrom, and then the contact bumps 35a are ascended by the assistant devices 25d. As a result, the contact bumps 35a, being coupled to the ascending and descending holes 25b of the first and second sleeves 25,25', respectively, are ascended and then inserted into the key holes 35c so that a set-up operation of the electrode unit 30 is completed.

With a method described in detail above, the electrode unit 30 is contacted with the first and second high voltage cables 10,10' through the first and second sleeves 25,25'. Thereafter, the tube body 40 and the stress relief covers 50 are assembled and then the manufacturing operation of the joint box 1 is completed.

Accordingly, after the first and second conductors 15-1, 15-2 of the first and second high voltage cables 10,10' are separately fixed with pressure to the first and second sleeves 25,25', the first and second sleeves 25,25' are contacted with each other within the electrode unit 30, and then the first and second sleeves 25,25' are connected to the electrode unit 30 by using each stop pin 37 in the present invention so that the length of the first and second metal sheaths 17-1,17-2 to be cut is minimized and thus the length of the joint box 1 is reduced.

As various modifications could be made in the constructions and method herein described and illustrated without departing from the scope of the present invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A device for connecting high voltage cables comprising:
   a connection element, comprising first and second sleeves, each having a protrusion on a top thereof, for receiving first and second conductors, respectively, of first and second high voltage cables and fixing the first and second conductors with pressure;
   a contact bump, being coupled to the protrusion in a sliding manner and being ascended and descended through an assistant device;
   an electrode unit including a key hole that the contact bump selectively contacts; and
   wherein the first and second sleeves are coupled mutually in a manner of male and female coupling.

2. The device for connecting high voltage cables of claim 1, wherein an ascending and descending hole where the contact bump is capable of moving to and fro is formed on a top surface of the protrusion.

3. The device for connecting high voltage cables of claim 2, wherein the assistant device is equipped within the ascending and descending hole and is embodied by a spring for providing resilient force.

4. The device for connecting high voltage cables of claim 1, wherein the device for connecting high voltage cables further comprises a stop pin for maintaining the contact bump in a non-contact state with the electrode unit.

5. The device for connecting high voltage cables of claim 4, wherein the protrusion and the contact bump, respectively, have a through-hole where the stop pin is inserted.

6. The device for connecting high voltage cables of claim 1, wherein at least either one of the first and second sleeves has an electric contact band for inducing electric contact.

7. A joint box comprising:
   a connection element, being comprised of first and second sleeves, each having a protrusion on a top thereof, for receiving first and second conductors, respectively, of first and second high voltage cables and fixing the first and second conductors with pressure;
   a contact bump, being coupled to the protrusion in a sliding manner and being ascended and descended through an assistant device;
   an electrode unit having a key hole that the contact bump selectively contacts with;
   a tube body for wrapping insulator being filled around the electrode unit; and
   stress relief covers, being coupled to both ends of the tube body, for pressing tightly the insulator to the first and second conductors,
   wherein the first and second sleeves are coupled mutually in a manner of male and female coupling.

8. The device for connecting high voltage cables of claim 1, wherein the assistant device is equipped within the ascending and descending hole and is embodied by a spring for providing resilient force.

* * * * *